(12) United States Patent
Ticknor (10) Patent No.: US 7,320,720 B2
(45) Date of Patent: Jan. 22, 2008

(54) INTERLOCKING FILTRATION DEVICE

(76) Inventor: Kirk Ticknor, 4800 Tumberry La., Columbus, GA (US) 31909

( * ) Notice: Subject to any disclaimer, the term of this patent is extended or adjusted under 35 U.S.C. 154(b) by 240 days.

(21) Appl. No.: 11/252,145

(22) Filed: Oct. 17, 2005

(65) Prior Publication Data

US 2007/0084167 A1   Apr. 19, 2007

(51) Int. Cl.
*B01D 50/00*   (2006.01)
*B01D 46/00*   (2006.01)
(52) U.S. Cl. ............... 55/483; 55/484; 55/502; 55/503; 55/511; 55/DIG. 31
(58) Field of Classification Search ......... 55/481, 55/483, 484, 493, 502, 503, 506, 511, DIG. 31, 55/509
See application file for complete search history.

(56) References Cited

U.S. PATENT DOCUMENTS

| | | | |
|---|---|---|---|
| 2,252,724 A | | 8/1941 | Myers |
| 2,792,906 A | | 5/1957 | Evans |
| 3,280,541 A | | 10/1966 | Soltis |
| 3,430,771 A | * | 3/1969 | Dreher .................... 210/323.1 |
| 3,498,590 A | * | 3/1970 | Furlong ....................... 261/111 |
| 3,707,046 A | * | 12/1972 | De Baun ....................... 55/483 |
| 3,775,995 A | | 12/1973 | Conley et al. |
| 4,049,406 A | * | 9/1977 | Rivers .......................... 96/129 |
| 4,105,422 A | | 8/1978 | Kiguchi |
| 4,684,381 A | | 8/1987 | Wasylyniuk |
| 5,797,975 A | * | 8/1998 | Davis ........................... 55/493 |
| 5,840,094 A | | 11/1998 | Osendorf et al. |
| 5,843,198 A | | 12/1998 | Walker |
| 5,902,361 A | | 5/1999 | Pomplun et al. |
| 6,045,598 A | | 4/2000 | Fath et al. |
| 6,126,708 A | | 10/2000 | Mack et al. |
| 6,162,272 A | | 12/2000 | Michaelis et al. |
| 6,267,796 B1 | | 7/2001 | Schottmer |
| 6,406,509 B1 | * | 6/2002 | Duffy ........................... 55/492 |
| 6,447,566 B1 | * | 9/2002 | Rivera et al. .................. 55/482 |
| 6,454,826 B2 | | 9/2002 | Fath et al. |
| 6,716,266 B2 | | 4/2004 | McNaughton |
| 6,740,136 B2 | | 5/2004 | Duffy |
| 6,916,352 B2 | | 7/2005 | Sutton et al. |
| 7,128,771 B2 | * | 10/2006 | Harden ....................... 55/385.2 |
| 2003/0150196 A1 | * | 8/2003 | Duffy ......................... 55/385.2 |

* cited by examiner

*Primary Examiner*—Duane Smith
*Assistant Examiner*—Robert A Clemente
(74) *Attorney, Agent, or Firm*—Myers & Kaplan, LLC; Sandra M. Drummond (57) ABSTRACT

A filtration device adapted for adjustably interlocking with adjacent filtration devices in a filter bank, wherein inversely disposed flaps on opposing sidewalls, such us an upper flap disposed along a first sidewall and a lower flap disposed along an opposing sidewall, overlap to interlock and prevent air flow between adjacent filters. Each flap may comprise a single member, or may include multiple folded sections, and may be color coded or provided with installation instructions, may be manufactured integrally with an air filter frame, or may be formed separately and adhered to the frame prior to filter installation, and a flap may also include an adhesive for adhering interlocking flaps together.

16 Claims, 6 Drawing Sheets

INTERLOCKING FILTRATION DEVICE

FIELD OF THE INVENTION

The present invention relates in general to filtering devices. In particular, the invention relates to air filter devices for use in filter bank applications in which multiple adjacent air filters are deployed.

BACKGROUND OF THE INVENTION

Air filters are generally known in the art and are employed in a variety of contexts including internal combustion engines, gas compressors and heating and ventilation systems. Designed to remove particulate matter from the air, a typical air filter is composed of a filtering material, often paper or foam, and a frame or housing that supports the filtering material. Typically an air filter is placed in the path of an air flow, such as proximate an air intake.

For an air filter to function properly and effectively, the air flow path should be directed toward and forced through the filtering portion of the air filter so that impurities in the air are removed. Thus, an air filter should be arranged to maximize air flow through the filter portion and to minimize the air flow around the filter edges. When an air flow bypasses an air filter, the performance of the filtration system is diminished, irrespective of the quality of air filter used. Therefore, it is important that an air filter be properly fitted for its intended application so as to ensure air flow through the filter portion. Ventilation ductwork and filter banks may vary in dimensions and, as a result, an air filter that may be of appropriate size for one application may not be suitable for an alternate application. To avoid the requirement of custom fitted air filters, there is a need for an air filter that can be adaptively fitted to spaces of varying dimensions while continuing to provide exceptional performance.

In some applications, particularly those related to commercial and industrial operations, the ventilation ducts may be quite large. Typically, several air filters are used side-by-side, sliding into air handlers. A single very large air filter for such use would likely be prohibitively expensive, cumbersome to install, and/or difficult to support. Thus, an array of air filters arranged adjacent to one another is typically employed as a filter bank. Traditional air filters of a filter bank, as slidably installed into a traditional air handler, often have a small gap disadvantageously therebetween. As such, some percentage of air flow may avoid being filtered by the filter bank prior to being circulated throughout the building.

Thus, whenever multiple air filters are juxtaposed one to another, a potential problem arises: the possibility of air flow through gaps between adjacent air filters. Bypassing the filtering portion of an air filter, air containing particulate matter including allergens and impurities may circulate under pressure throughout a building, exposing employees, patrons, or inhabitants to the harmful effects of its contaminants. Even when the gap between filters is narrow relative to the filter width, the volume of unfiltered air delivered to a building over time may be sufficient to produce detrimental effects on air quality. The effects may be particularly hazardous to people with asthma, allergies or other respiratory conditions.

As the efficiency of air filters increases, with some filters operating at 99.9% efficiency, the detrimental effects caused by unfiltered air flowing through a ventilation system becomes even more significant. Furthermore, in addition to adverse effects on individuals and operations within a building structure, unfiltered air flow may also induce mechanical problems within the ventilation system itself. Dust particles may be deposited on the heating and cooling coils, clogging the coils and impeding proper ventilation system operation. Cleaning such coils is both time consuming and expensive. Thus, there is a need for an air filter that prohibits an air stream from passing through gaps between air filters in a filter bank, thereby essentially preventing the flow of unfiltered air into a building.

In striving to attain healthy, high quality air for domestic and commercial environments, a high quality air filter, such as an HEPA filter, is often employed. However, HEPA filters may also be quite expensive, particularly when a large number of them are required for a filter bank. Further, although a HEPA filter may remove 99.9% of the particulates present in an air stream, it is first necessary that the air stream pass through the filter in order for success. A less expensive tactic than installation of HEPA filters for improving air quality is to decrease the volume of air permitted to bypass a filtration system. In this manner, cheaper, less efficient filters may be used to achieve the goal of high air quality. Thus, there is a need for inexpensive filters that may be easily installed in a manner that reduces air flow around the filters, thereby preventing the gross by-pass of filters and thereby increasing the overall air quality without requiring the use of expensive filter devices.

In the past, improvements have been suggested for filtering devices and the prevention of air flow therearound. One type of design is directed toward prevention of air bypass in a filter bank and a filter assembly, wherein as filter panels are inserted through an access opening in a filter bank, they are connected in side by side relation with "T"-shaped connectors. Sides of adjoining filter panels are inserted into opposed channels of the "T"-shaped connectors, wherein the positioning of the "T"-shaped connector helps prevent air bypass between the sides of adjacent filter panels. Although adequate for its intended purpose, such a design is disadvantageous in view of the present invention due to the requirement of using a connector piece separate from the filter itself.

Because the connector piece is inserted separately from the air filter, such filter installation process would disadvantageously be more time-consuming and cumbersome than that of installing filters alone. There is also the risk that an installer may inadvertently drop a connector piece into the filter bank and be forced to extract and reposition it, prolonging the installation process. In addition, installation may be dependent upon having an adequate supply of both connector pieces and air filters on site, possibly requiring installers to transport an increased volume of materials and supplies to installation sites.

Another type of filter design is that of a filter cartridge made of an accordion fold pack which can be inserted in a frame and used to filter air in ventilating systems. The filter cartridge can be cut to a desired size and sealed with sealing elements disposed at the end faces. The sealing elements fit into an insert opening of a frame or housing so that their end edges lie sealingly against the housing wall. The sealing elements may be variously shaped and extended outward, however, they are designed to seal the cartridge and fit it within a housing; thus, such a cartridge does not address the need for blocking air flow between multiple framed cartridges.

Another type of filter is intended for use in a kitchen range hood, wherein a boxlike frame is defined by a first U-shaped cross-section frame member and a second, inversely U-shaped cross-section frame member. Each frame member is provided with ridges used for fitting the members together to form a single filtration device. The ridges may also be used for joining adjacent filtration devices together. However, such ridges, typically composed of stainless steel, are designed to maintain a predetermined shape and dimension, and adjoining filtration devices are separated by a predetermined distance. As a result, the positioning of adjacent filters is not adjustable in a manner that may accommodate variably sized filter locations.

Therefore, it is readily apparent that there is a need for a filtration device that is adjustable, and that inhibits the undesirable passage of air about the peripheral edges.

BRIEF SUMMARY OF THE INVENTION

Briefly described, in a preferred embodiment, the present invention overcomes the above-mentioned disadvantages and meets the recognized need for such a device by providing an air filter adapted to adjustably interlock with adjacent air filters so as to block air flow between them and prevent the flow of unfiltered air through a ventilation system.

According to its major aspects and broadly stated, in its preferred form, the present invention is an air filter having inversely disposed interacting flaps, thereby allowing a plurality of filters to be installed in an interlocking manner to form an air filter system operable in a variety of environments. Further, because the air filters may be adjustably interconnected, the filters may be deployed in settings of variable dimensions.

More specifically, the device of the present invention in its preferred form is an air filter with non-permeable flaps inversely disposed at opposing sidewalls of its frame; i.e. on a left sidewall a flap is hingedly disposed at an upper portion of the sidewall to extend downward, and on the opposing right sidewall the flap is hingedly disposed at a lower portion of the sidewall to extend upward. The inverse orientation of flaps on opposing sidewalls allows the flaps of adjacent air filters to overlap and interlock. The flaps may be angularly adjustable or disposed at a fixed predetermined orientation, wherein the manner in which flaps of adjacent air filters interlock allows flexibility in the positioning of the air filters.

The flaps may be disposed so that the filters may interlock along their widths and/or their lengths, and may be color-coded to simplify and facilitate the installation process. In addition, the flaps may also have an exposable adhesive layer that can be used for adhering the interlocking flaps together. A flap of the present invention may be composed of multiple folds arranged in a zigzag formation, thereby allowing the flap to further extend outward from the frame while coincidently interlocking in an overlapping manner to prevent air from flowing between adjacent air filters.

In an exemplary embodiment of the present invention, the flaps may be integrally formed with the air filter frame at the time of manufacture. Alternatively, the flaps may be manufactured separately from the air filter frame and include an adhesive layer that may be used by an installer to attach the flap to the frame prior to filter installation. In this manner, the flaps may be secured to the filter frame as needed for a particular application.

Multiple air filters of the present invention may be arranged and interlocked to create an air filtration system that directs an air stream through the filters, while preventing it from circulating between or around the air filters, thereby improving air quality for domestic, commercial and industrial environments. The interlocking feature of the invention allows multiple air filters to be installed in a filter bank, and to provide air filter coverage for a large area in a relatively easy manner. The invention has the further advantage that the interlocked air filters may be easily removed when it is time to replace them. Because the air filters are interlocked, they may be removed together rather than having to remove each one separately.

An exemplary method of practicing the invention may include: providing a first air filter; providing a second filter adapted for interlocking with the first air filter; and interlocking the first and second air filters to prevent air flow between the first and second air filter. The second air filter may be interlocked, or complimentarily interwoven, with the first air filter by positioning the second filter so that a flap disposed along a vertical sidewall of the second air filter overlaps, underlies, or complimentarily interweaves with a flap disposed along a vertical sidewall of the first air filter. An exemplary method may further include exposing an adhesive layer on an extended flap so that it may adhere to the flap of the adjacent filter with which it interlocks.

The method may also include adjusting the separation distance between air filters while maintaining the flaps in an interlocking position so that the air filters cover the air space in an optimal manner that prevents intake air from passing around or between air filters. The method may further include positioning additional air filters in a like manner as required for a particular application. Because the air filters may interlock along their widths as well as their lengths, and may be separated by varying separation distances, installation of the air filters of the present invention is relatively simple and quick, allowing an installer to perform the installation in a cost-effective manner.

Therefore, a feature and advantage of the present invention is its simplicity of installation for the mechanic.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Thus, exemplary embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not intended to be considered limitations. Directional terms such as left, right, front or rear are provided to assist in the understanding of the invention and are not intended to be considered as limitations.

Figure 1:
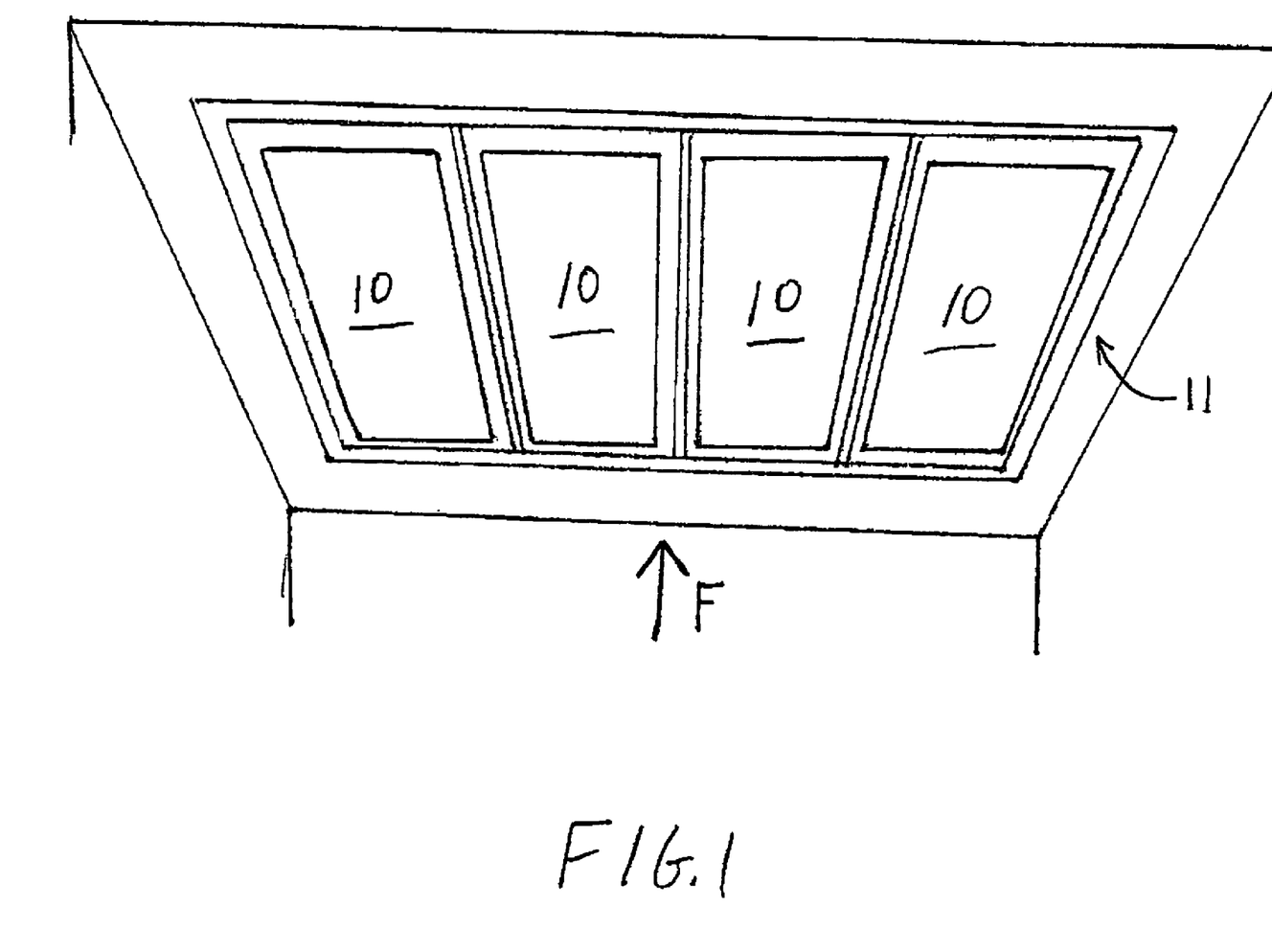
FIG. 1 is a front view of an interlocking filtration device, according to the preferred embodiment of the present invention, showing an exemplary side-by-side installation of a plurality of interlocking filtration devices.
Figure 2:
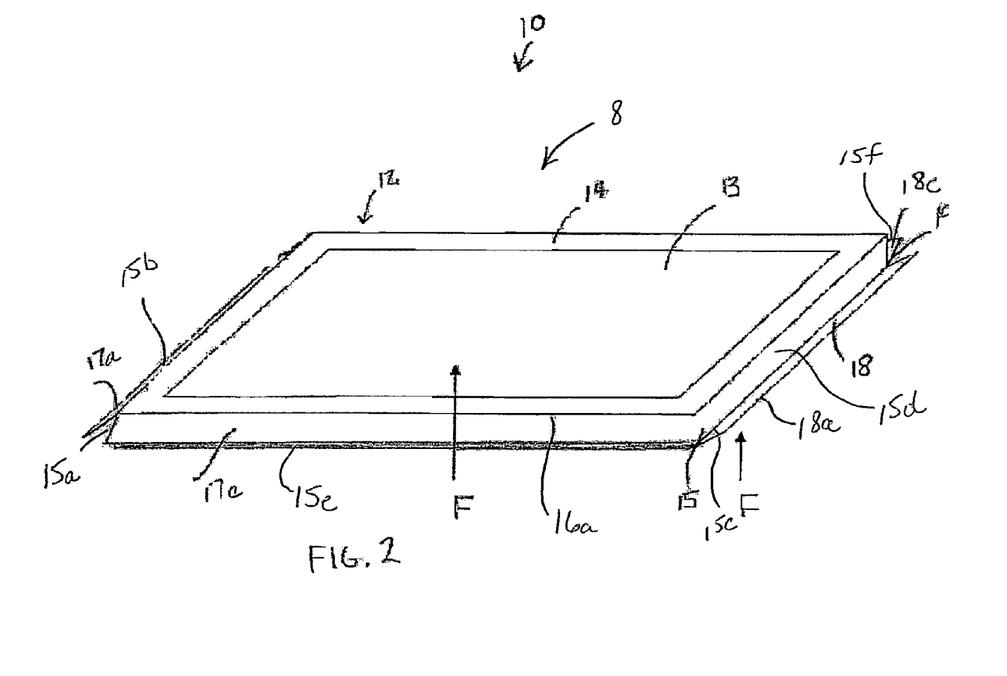
FIG. 2 is a perspective view of an interlocking filtration device, according to the preferred embodiment of the present invention.

Referring now to FIGS. 1-2, the present invention in the preferred embodiment is filtration device 8, preferably air filter 10, adapted for adjustably interlocking with neighboring air filters in a manner that essentially prevents air from circulating around and/or between adjacent air filters. As seen in FIG. 1, multiple air filters 10 are preferably arranged in filter bank 11 and subject to an air flow F. The air filters 10 are interlocked so that an incoming air flow F is directed through the filters 10 and prevented from traveling therebetween.

FIG. 2 depicts an exemplary embodiment of the air filter 10, wherein air filter 10 is preferably composed of filter portion 13 and frame 12. Filter portion 13 may comprise paper, foam, or any other material suitably adapted for functioning as a filter. Frame 12 preferably holds and supports filter portion 13 so that air filter 10 may be installed in filter bank 11, in a ventilation duct, or in any other cavity or receptacle adapted for receiving an air filter. Frame 12 may be made of cardboard or other substance of sufficient characteristics for adequately supporting filter portion 13 in its environment, where filter portion 13 is subject to an air flow F. Frame 12 preferably includes lip 14 that preferably forms an upper surface around the perimeter of frame. 12 and is typically and preferably oriented perpendicular to an air stream. In the preferred embodiment, perpendicularly adjoining lip 14 are four sidewalls 15 that define the sides of frame 12 and are preferably oriented in the direction of the air flow F. Frame 12 is preferably adapted for interlocking with adjacent air filters 10 so that the air flow F is directed through filter portion 13 and is prevented from circulating around air filter 10.

Frame 12 is preferably adapted for interlocking with adjacent air filters 10 via plurality of flanges or flaps 17-18 hingedly disposed along sidewalls 15. In the preferred embodiment, plurality of flaps 17 is preferably inversely disposed on opposing sidewalls 15. By way of example and not of limitation, upper flap 17a is preferably disposed along an upper edge portion 15b of left sidewall 15a, extending outwardly and downwardly relative thereto; and lower flap 18a is preferably disposed along a lower edge portion 15c of opposing right sidewall 15d, extending outwardly and upwardly relative thereto. This preferred inverse orientation of upper flap 17a and lower flap 18a on opposing sidewalls 15a and 15d, respectively, uniquely tailors air filter 10 for interlocking with an adjacent air filter 10.

Preferably, plurality of flaps 17, 18 are composed of a non-permeable material of sufficient characteristics such that plurality of flaps 17, 18 do not appreciatively flex or bend when positioned in the path of an incoming air stream F. Each flap of plurality of flaps 17, 18 preferably may be adjustably angled outward so that upper flap 17a of a first air filter 10 may be angled to overlap lower flap 18a of an adjacent second air filter 10, thereby preventing air from flowing therebetween.

Alternatively, plurality of flaps 17, 18 may be oriented at a predetermined angle in order to facilitate interlocking with flaps 17 and/or 18 of neighboring air filters 10. Plurality of flaps 17, 18 may include an exposable adhesive layer 60 to facilitate adherence of each interlocking flap 17, 18 to a corresponding flap 17, 18 of an adjacent air filter 10. A protective covering (not shown) may be removed by an installer to expose adhesive 60 during the installation process. As flaps 17, 18 of adjacent air filters 10 are interlocked, pressure may be applied to assure proper adherence, in order to provide an air tight barrier against air flow between the filters 10. Apart from the interlocking capability, flaps 17, 18 also facilitate adaptation of a single air filter 10 to variably dimensioned ventilation equipment, wherein plurality of flaps 17, 18 may be adjustably extended so as to optimally fit the spatial dimensions of the intended deployment location.

In an exemplary embodiment of the present invention, flap 17c may be disposed along upper edge 16a of sidewall 15e, with upper edge 16a defined as the intersection of lip 14 with sidewall 15e. Similarly, flap 18c may be disposed along bottom edge 19a of sidewall 15f. When flaps 17c and 18c are disposed along edges 16a and 19a, the overall peripheral dimensions of air filter 10 can be maximized via flaps 17, 18, thereby increasing the amount of potential overlap with flaps 17, 18 of adjacent air filters 10.

Figure 3:
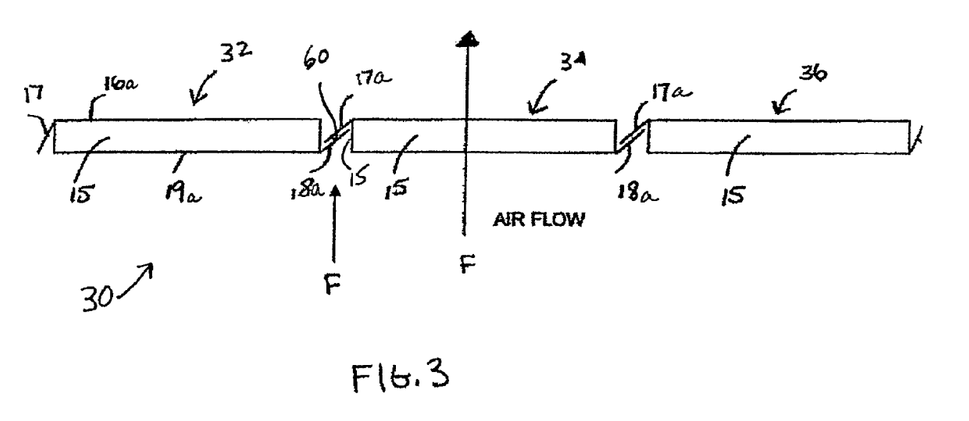
FIG. 3 is a side view of an interlocking filtration device, according to the preferred embodiment of the present invention, showing an exemplary side-by-side interlocking arrangement of a plurality of interlocking filtration devices.

The preferred interlocking feature of the invention is illustrated in FIG. 3, wherein three air filters 32, 34, 36 are depicted in an interlocking arrangement to form air filter system 30. The preferred inverse orientation of upper and lower flaps 17a, 18a on opposing sidewalls 15 allows air filter 34 to interlock with both adjacent neighbors. As shown, air filter 32 may have lower flap 18a angled outward and upward. Air filter 34 may have upper flap 17a angled outward and downward so as to overlap lower flap 18a of air filter 32. Air filter 34 may also have lower flap 18a, which underlies upper flap 17a of air filter 36. When air filter 32 is positioned first, air filter 34 may be rotated so that upper flap 17a is proximate to air filter 32 so that air filters 32 and 34 may interlock. Air filter 34 may then be positioned so that its flap 17a overlaps with flap 18a of air filter 32, thereby enabling two air filters 32, 34 to interlock. In a similar manner, third air filter 36 may be rotated as necessary, positioned, and interlocked with air filter 34.

In an alternate embodiment, air filters 32, 34, 36 may be equipped with inversely disposed flaps 17c, 18c along front and rear opposing sidewalls 15e, 15f, respectively (not shown in FIG. 3), allowing air filters 32, 34, 36 to interlock lengthwise and/or widthwise with an adjacent neighbor. It is noted that filters 32, 34, 36 may be inserted into an air filter receptacle sequentially and interlocked as each is installed to form a filter bank, or may be interlocked prior to insertion, depending on the type of filter holder used for a particular application.

In the preferred embodiment, plurality of flaps 15, 17 may be integrally formed with frame 12 at the time of manufacture. Further, plurality of flaps 15, 17 may be color coded to facilitate installation, and/or may have simple instructions printed thereon. In an alternate embodiment, plurality of flaps 15, 17 may be manufactured separately and attached to frame 12 at some point prior to installation.

Figure 4:
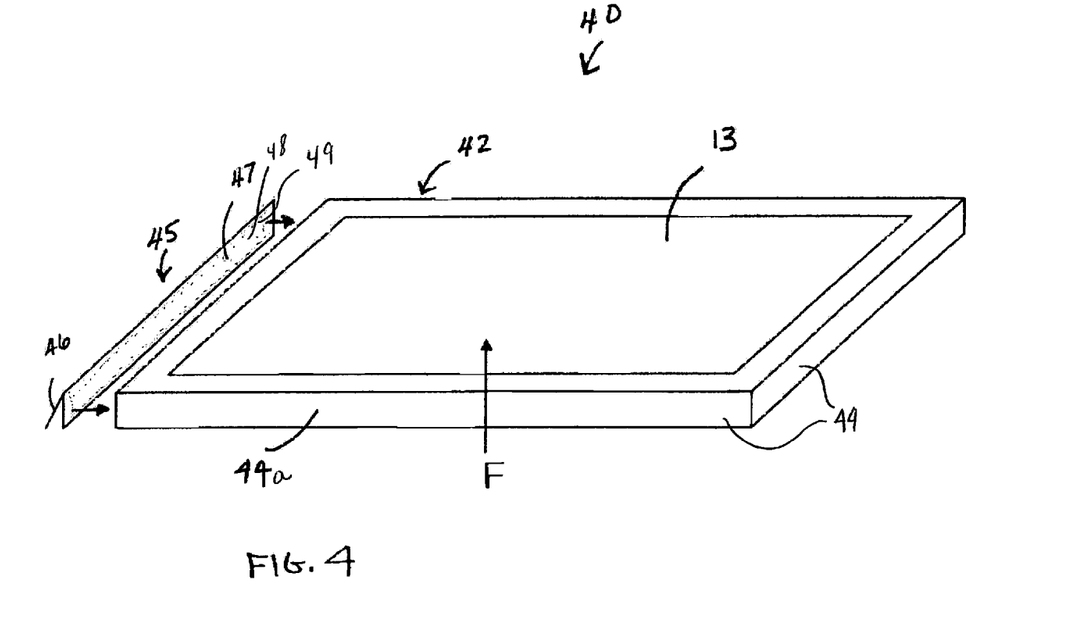
FIG. 4 is a perspective view of an interlocking filtration device, according to an alternate embodiment of the present invention.

Referring to FIG. 4, alternate air filter 40 is shown with frame 42 and flap attachment 45, wherein flap attachment 45 includes flap 46 and flap coupler 47 adapted for coupling flap 46 to frame 42. Flap attachment 45 may be coupled to frame sidewall 44 so that flap 46 is hingedly disposed along an upper portion of frame sidewall 44, extending outwardly and downwardly therefrom. Alternatively, flap attachment 45 may be rotated so that flap 46 may be hingedly disposed along a lower portion of frame sidewall 44, extending outwardly and upwardly therefrom. Thus, flap attachment 45 may be coupled to any frame sidewall 44, as selected by the user, in an orientation also selected by the user to suit the purpose at hand. The universality of flap attachment 45 gives the installer an added degree of flexibility during the installation process, as flap attachments 45 may be coupled to air filter 40 as needed, given a particular application.

In an exemplary embodiment, flap attachment 45 may be adhered to first frame sidewall 44a. Adhesive layer 48 may be applied to flap coupler 47 during its manufacture and protective covering 49 may be placed over it. An installer may expose adhesive layer 48 in order to attach flap coupler 47 to a sidewall 44. An advantage of using an adhesive to couple flap coupler 47 to frame sidewall 44 is that flap coupler 47 may be in close contact with frame sidewall 44, decreasing the possibility of air flow thereabout. A further advantage of adhesive is that it provides the installer with a relatively quick and simple means of attaching a flap when necessary.

Figure 5A:
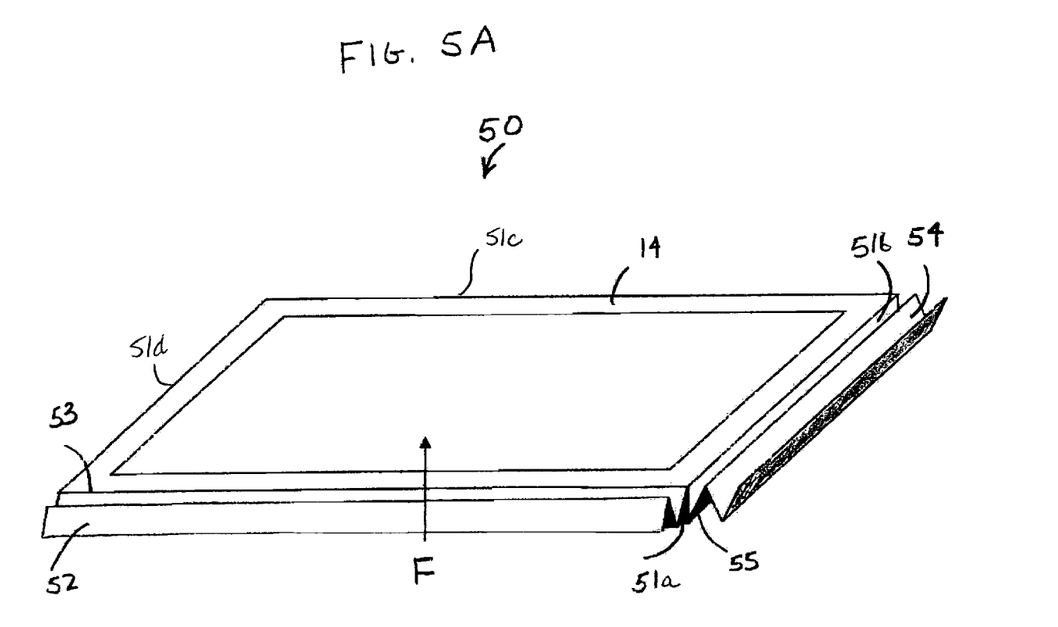
FIG. 5A is a perspective view of an interlocking filtration device, according to an alternate embodiment of the present invention.

Referring to FIG. 5A, a further alternate embodiment of the present invention is shown, wherein air filter 50 has multiply-folded upper flap 52 extending from first frame sidewall 51a. The multiple folds of flap 52 may be arranged in a zigzag manner to allow flap 52 to expand an adjustable distance from frame sidewall 51a. The expandability of flap 52 allows air filter 50 to adapt to environments of various sizes while blocking air flow around filter 50.

Upper flap 52 may be hingedly disposed along an upper portion of frame sidewall 51a. Inversely disposed, multiply-folded lower flap 54 may be hingedly disposed along a lower portion of frame sidewall 51b so that flaps 52 and 54 of adjacent air filters 50 may overlap and interlock. In an exemplary embodiment of the invention, opposing sidewalls 51a, 51c may have inversely disposed flaps 52, 54. By way of example and not of limitation, left sidewall 51d may have upper flap 52, and opposing right sidewall 51b may have lower flap 54. Similarly, front sidewall 51a may have upper flap 52, while opposing back sidewall 51c has lower flap 54. In an exemplary embodiment, lower flap 54 may be hingedly disposed along lower edge 55 of frame sidewall 51b and upper flap 52 may be disposed along upper edge 53. Flaps 52, 54 may be disposed along any of the sidewalls 51a-51d so that air filter 50 may be adapted for interlocking along both its width and its length.

Figure 5B:
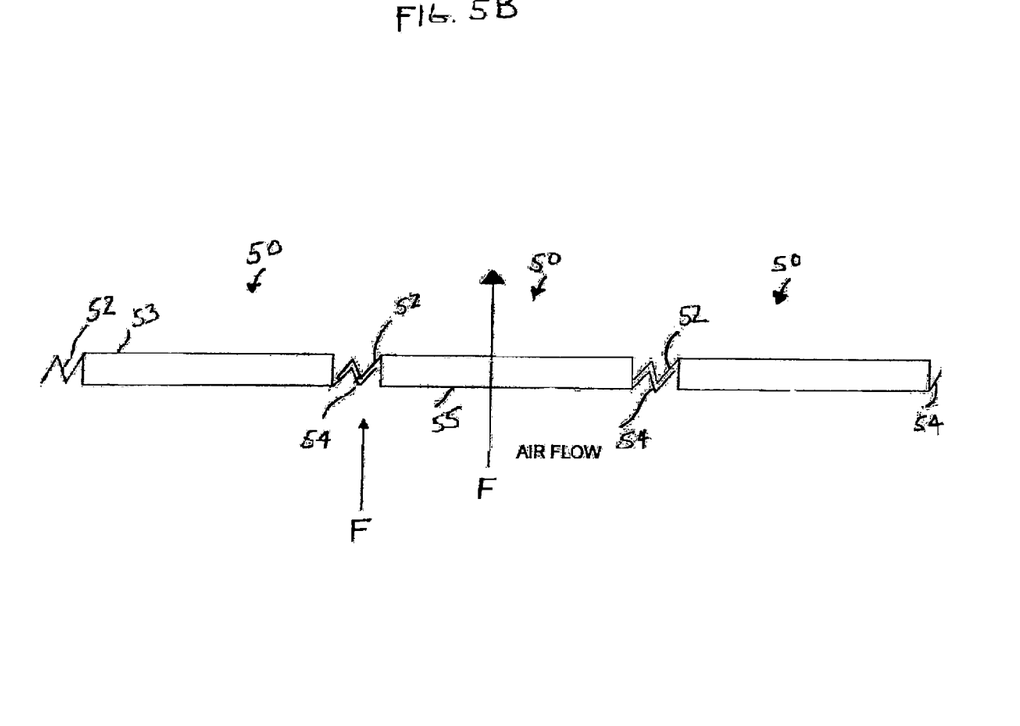
FIG. 5B is a side view of the interlocking filtration device of FIG. 5A, showing a side-by-side interlocking arrangement of a plurality of interlocking filtration devices.

FIG. 5B illustrates the alternate manner in which multiple air filters 50 may be arranged together in an interlocking filter array. Each upper flap 52 of each air filter 50 may be extended and adjusted to overlap each lower flap 54 of neighboring air filter 50. The expandability and adjustability of flaps 52 and 54 allow adjacent air filters 50 to interlock even when variably spaced apart, obviating the need for an installer to position filters 50 at a predetermined separation distance, and allowing air filters 50 to be employed in variously sized environments.

Flaps 52, 54 may be integrally manufactured with air filter 50 frame, or may be manufactured separately and coupled to air filter 50 prior to installation. When manufactured separately, flaps 52, 54 may be coupled to air filter 50 via an adhesive applied to flaps 52, 54. Flaps 52, 54 may also have an exposable adhesive layer adapted for adhering interlocking flaps of adjacent air filters 50 together.

In an exemplary method of practicing the invention, an air filter installer preferably proceeds to a commercial installation site, wherein the ventilation ductwork may be relatively large. Rather than using a single filter of sufficiently large size, the installer installs multiple interlockable air filters 10, as shown in FIG. 1, into an air handler. By properly adjoining and interlocking multiple air filters 10, air flow between and around air filters 10 may be blocked, forcing the air through filter portion 13, so that impurities, allergens and other particulate matter may be removed from the air before it is circulated throughout the building.

The installer preferably selects first air filter 32, as shown in FIG. 3, positioning same with flap 18a extended outward. Flap 18a may be color coded to indicate its type and orientation. The installer preferably notes the type or orientation of flap 18a, then select second air filter 34 to be positioned adjacent thereto. If necessary, the installer rotates second air filter 34 so that its flap 17a will be directed toward flap 18a of filter 32. The installer preferably then positions air filter 34 so that its flap 17a overlaps and thus interlocks with flap 18a of first air filter 32. The installer may also shift air filters 32, 34 closer together or farther apart in order to obtain an optimum fit for the given space, while maintaining an interlocked arrangement that will direct air through air filters 32, 34. The process may be repeated with additional air filters 36 as required to properly provide air filter coverage for a specified area in a manner that directs air through the filters, wherein any number of filters 10 may be interlocked in sequence.

An alternate method of practicing the invention could further include adhering interlocking flaps 17a, 18a of adjacent air filters 32 and 34 together using an exposable adhesive layer disposed along flap 17a and/or 18a. The installer may peel off a protective covering to expose the adhesive layer prior to interlocking flaps 17a, 18a of adjacent air filters 32 and 34. Pressure may be applied to enhance the adherence of interlocking flaps 17a and 18a. Adhering interlocking flaps 17a and 18a together provides an additional means of blocking air flow between filters 32 and 34 and improving the air filtration system performance.

Another alternate and exemplary method of the invention may further include attaching one or more flaps 46 to air filter 40 prior to its installation. Flap 46 may be attached by adhering flap attachment 45 to frame sidewall 44. In this manner, flaps 46 may be attached to air filters 40 by the installer as needed for a particular application.

In another alternate embodiment, flaps 17, 18 could be formed with filtrative capabilities; that is, flaps 17, 18 could additionally function to capture particles in the air that attempt to pass between adjacent filters 10.

While particular embodiments of the present invention have been described herein; it will be apparent to those skilled in the art that alterations and modifications may be made to the described embodiments without departing from the scope of the appended claims.

What is claimed is:

1. A filter device comprising:
   a filtration substrate portion;
   a filtration substrate retention frame; and
   at least one flap disposed along the length of at least one sidewall of said frame, said at least one flap dimensioned to complementarily interweave with a flap of a second said filter device,
   wherein said at least one flap of said frame and said flap of said second said filter device are inversely disposed along opposing sidewalls.

2. The filter device of claim 1, wherein each said at least one flap is hingedly disposed along said sidewall.

3. The filter device of claim 1, wherein said at least two inversely disposed flaps comprise an upper flap, disposed along a first sidewall, and a lower flap, disposed along an opposing sidewall.

4. The filter device of claim 1, wherein said at least one flap is disposed along an edge of said sidewall.

5. The filter device of claim 1, wherein said at least one flap is integrally formed with said frame.

6. The filter device of claim 1, wherein said at least one flap is coupled to said frame via an adhesive.

7. A method of air filtration utilizing the filter device of claim 1, comprising:
   providing a first said filter device;
   providing a second said filter device;
   adjustably interlocking said frame of said first filter device with said frame of said second filter device within an air handling system; and
   passing air through said first and second filter devices.

8. A filter device comprising:
   a filtration substrate portion;
   a filtration substrate retention frame; and
   at least one flap disposed along the length of at least one sidewall of said frame, said at least one flap dimensioned to complementarily interweave with a flap of a second said filter device,
   wherein said at least one flap is integrally formed with said frame, and wherein said at least one flap has an accessible adhesive layer.

9. A filter device comprising:
   a filtration substrate portion;
   a filtration substrate retention frame; and
   at least one flap disposed along the length of at least one sidewall of said frame, said at least one flap dimensioned to complementarily interweave with a flap of a second said filter device,
   wherein each said at least one flap has at least one adhesive layer.

10. A filter device comprising:
    a filtration substrate portion;
    a filtration substrate retention frame; and
    at least one flap disposed along the length of at least one sidewall of said frame, said at least one flap dimensioned to complementarily interweave with a flap of a second said filter device,
    wherein each said at least one flap comprises multiple lengthwise folds arranged in a zigzag manner.

11. A filter system comprising:
    at least two air filter devices adjustably interlocked via cooperating elongate, pivotable flaps carried thereby,
    wherein each said air filter device further comprises:
    a filter portion; and
    a frame coupled to said filter portion, said frame adapted with said cooperating elongate, pivotable flaps.

12. The system of claim 11, wherein each said air filter device comprises at least two opposingly positioned, inversely disposed flaps.

13. The system of claim 12, wherein said at least two opposingly positioned, inversely disposed flaps comprise an upper flap disposed along a first sidewall and a lower flap disposed along an opposing sidewall.

14. The system of claim 11, wherein each said flap has multiple folds arranged in a zigzag manner.

15. The system of claim 11, wherein at least one said flap has an adhesive layer for adhering to said cooperating, elongate, pivotable flap of an adjacent said air filter device.

16. The system of claim 11, wherein said flap is adheredly coupled to said frame.

* * * * *